United States Patent [19]

Goodford

[11] Patent Number: 4,600,238
[45] Date of Patent: Jul. 15, 1986

[54] RETRACTABLE SEAT COVER FOR AUTOMOTIVE VEHICLES

[76] Inventor: Thomas W. Goodford, 34326 Marquette, Westland, Mich. 48185

[21] Appl. No.: 691,390

[22] Filed: Jan. 14, 1985

[51] Int. Cl.⁴ ............................................ A47C 31/10
[52] U.S. Cl. .................................... 297/219; 297/229; 297/283
[58] Field of Search ............... 297/219, 227, 229, 223, 297/283, 475

[56] References Cited

U.S. PATENT DOCUMENTS

| | | | |
|---|---|---|---|
| 974,865 | 11/1910 | Dreher . | |
| 1,583,202 | 5/1926 | Thornbury . | |
| 1,985,222 | 12/1934 | Menhall . | |
| 2,467,468 | 4/1949 | Duby et al. | 297/219 |
| 2,804,914 | 9/1957 | Butcko et al. | 297/229 |
| 2,842,189 | 7/1958 | Graff | 297/227 |
| 3,199,916 | 8/1965 | Chiarenza | 297/229 |
| 3,276,817 | 10/1966 | Marple | 297/283 |
| 3,315,935 | 4/1967 | Clevett et al. | 297/475 |
| 3,455,603 | 7/1969 | Nicholas | 297/475 |
| 4,232,898 | 11/1980 | Bodrero . | |
| 4,396,227 | 8/1983 | Neilson . | |

FOREIGN PATENT DOCUMENTS 1162144  4/1958  France .................. 297/229

Primary Examiner—Francis K. Zugel
Attorney, Agent, or Firm—Barnes, Kisselle, Raische, Choate, Whittemore & Hulbert

[57] ABSTRACT

Seat covering designed to protect both the bottom seat cushion and the back seat cushion of the seat of an automotive vehicle. The protective covering comprises a bottom panel for covering the bottom seat cushion and a back panel for covering the back seat cushion. The panels are connected to a take-up reel mounted at the rear edge portion of the seat. The panels are withdrawn from the reel between the rear edge portion of the bottom seat cushion and the back seat cushion to positions of use respectively covering the bottom and back seat cushions.

9 Claims, 16 Drawing Figures

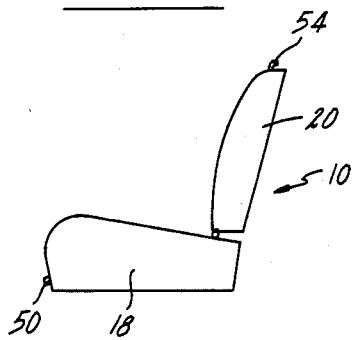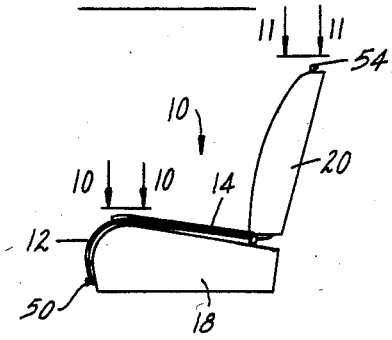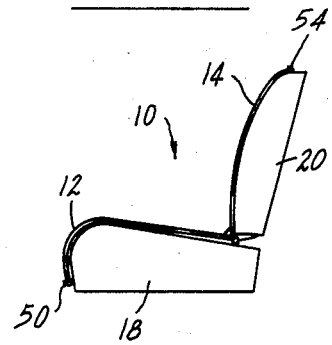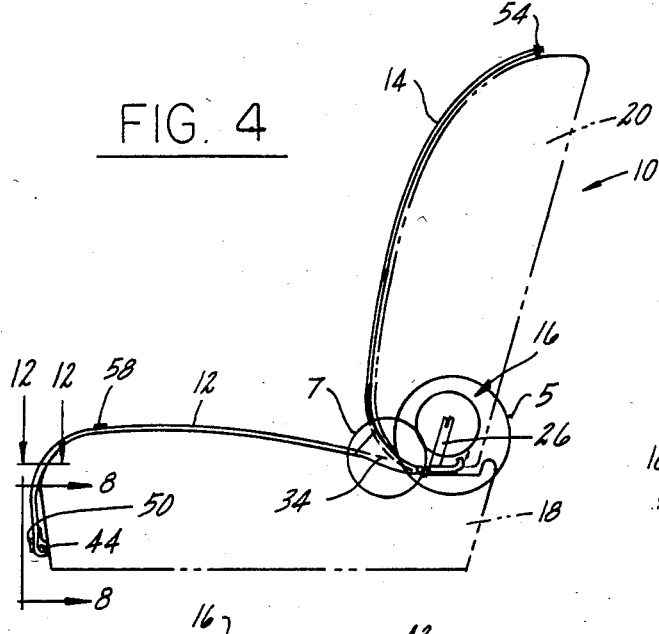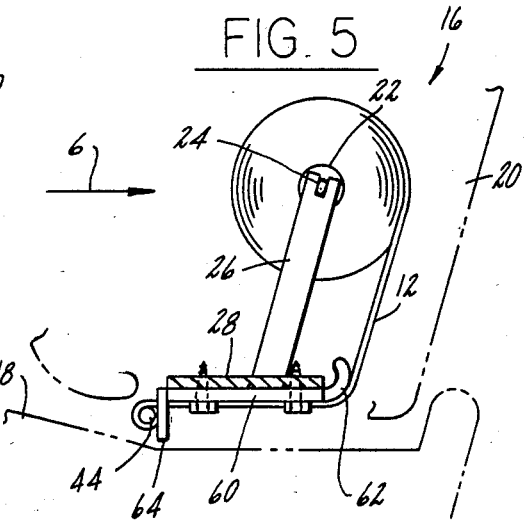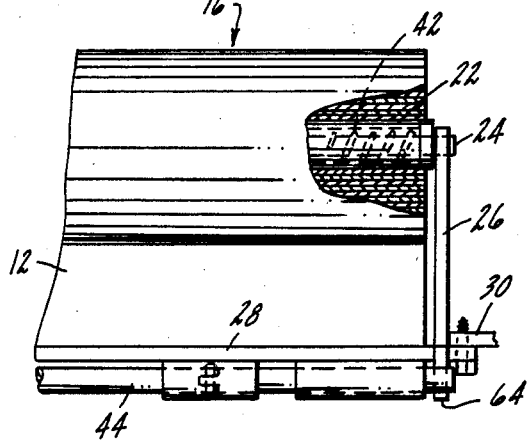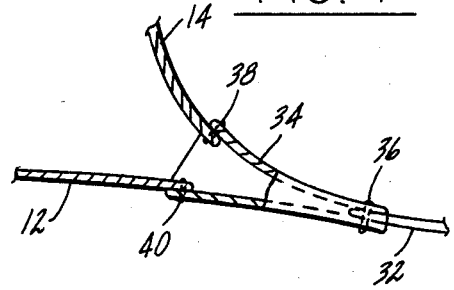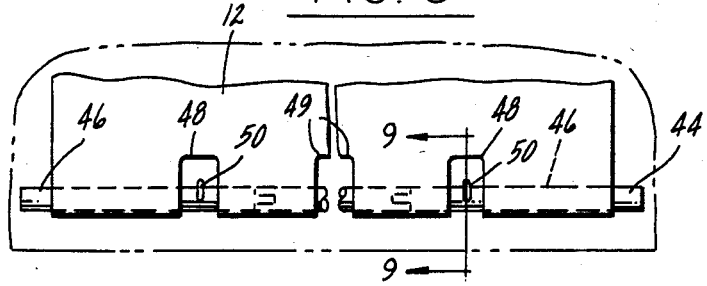

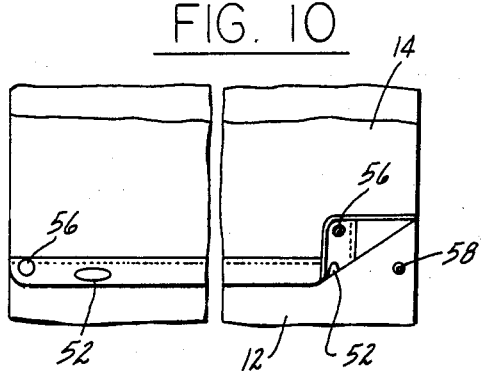
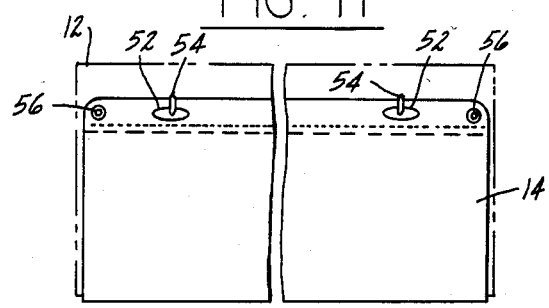
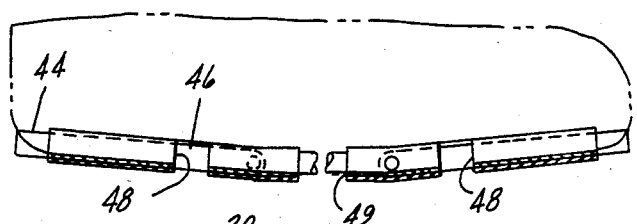
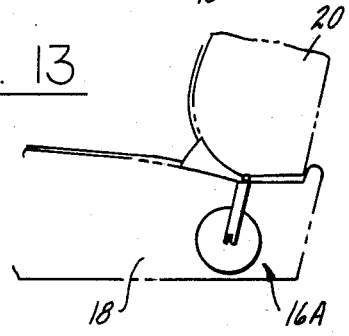
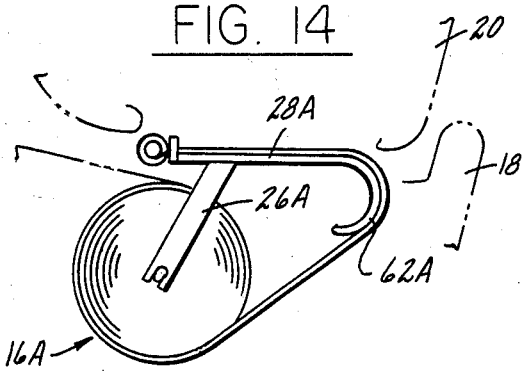
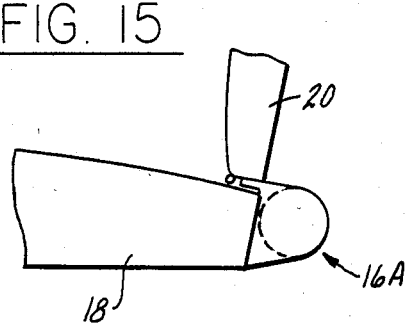
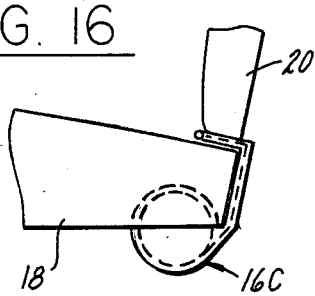

RETRACTABLE SEAT COVER FOR AUTOMOTIVE VEHICLES

This invention relates generally to seat covers and refers more particularly to retractable seat covers for automotive vehicles.

SUMMARY OF THE INVENTION

The seat covering of this invention is designed to protect both the bottom seat cushion and the back seat cushion from becoming soiled during ordinary use, thus preserving the cushion fabric in its original condition. The protective covering comprises a bottom panel for covering the bottom seat cushion and a back panel for covering the back seat cushion. A take-up reel is adapted to be mounted near the rear edge portion of the seat and the panels are connected to the reel. The bottom and back panels are adapted to be retracted onto the reel to an inoperative, stored position and to be withdrawn from the reel between the rear edge portion of the bottom seat cushion and the back seat cushion to positions of use respectively covering the bottom and back seat cushions.

More specifically, the means for securing the panels to the reel comprises a web wound on the reel and a sleeve having a closed end stitched to the web across the full width of the latter. The sleeve has an open end provided with opposed portions stitched respectively to an edge of the bottom panel and also to an edge of the back panel across the full width of the panels. Means are provided to releasably secure the panels to the cushions when in use, which may comprise interengaging hook and eye means along an edge of the back panel and also along the top portion of the back seat cushion, and a rod along an edge of the bottom panel adapted to be held to the bottom seat cushion by a series of hooks.

Preferably although not necessarily there may be snap fastener means or the like for securing the two panels together in surface-to-surface relation when they are reeled up on the take-up reel.

These and other objects and features of the invention will become more apparent as the following description proceeds, especially when considered with the accompanying drawings.

DESCRIPTION OF THE DRAWINGS

FIG. 1 is a semi-diagrammatic side elevational view of a seat for an automotive vehicle with the protective covering of my invention shown in a retracted position.

FIG. 2 is similar to FIG. 1 but shows the protective covering extended from the take-up reel, with the bottom panel releasably secured to the bottom seat cushion and the back panel releasably secured to the bottom panel.

FIG. 3 is similar to FIGS. 1 and 2 but shows the bottom and back panels releasably secured to the bottom and back seat cushions in their positions of use.

FIG. 4 is an enlarged view similar to FIG. 3, showing the outline of the seat in phantom lines and also illustrating the take-up reel.

FIG. 5 is an enlarged view of the portion 5 of FIG. 4.

FIG. 6 is a view looking in the direction of the arrow 6 in FIG. 5, with parts broken away.

FIG. 7 is an enlarged fragmentary view of the portion 7 of FIG. 4.

FIG. 8 is a fragmentary view taken on the line 8—8 in FIG. 4.

FIG. 9 is a fragmentary sectional view taken on the line 9—9 in FIG. 8.

FIG. 10 is an enlarged fragmentary view taken on the line 10—10 in FIG. 2.

FIG. 11 is an enlarged fragmentary view taken on the line 11—11 in FIG. 2.

FIG. 12 is a fragmentary sectional view taken on the line 12—12 in FIG. 4.

FIG. 13 is a fragmentary view showing a modification with the cover panels extended.

FIG. 14 is somewhat enlarged and shows the panels retracted.

FIGS. 15 and 16 show further modifications.

DETAILED DESCRIPTION

Referring now more particularly to the drawings and especially to FIGS. 1–12, the protective covering of this invention is generally designated 10 and comprises a bottom panel 12, a back panel 14 and a take-up reel 16. The protective covering 10 is shown in association with an automotive vehicle seat having a bottom seat cushion 18 and a back seat cushion 20 extending upwardly from the rear edge portion of the bottom seat cushion.

The bottom panel 12 of the protective covering 10 is in the form of a sheet of flexible material formed of a suitable fabric or the like. The panel 12 is generally rectangular and of sufficient size to cover substantially the entire top surface of the bottom seat cushion including the front edge portion thereof.

The back panel 14 may be formed of the same flexible material as the panel 12 and is likewise generally rectangular and of a size sufficient to cover substantially the entire front surface of the back cushion 20. It is of the same width as the bottom panel.

The take-up reel 16 is mounted within a space inside the back seat cushion 20 near the lower extremity thereof. The take-up reel may be of many different constructions but in the present instance comprises a tubular rod 22 having a bar 24 extending coaxially within the rod. The bar 24 is mounted by arms 26 on a horizontal platform 28 rigidly secured to anchor plates 30 in any suitable manner. A flexible web 32 is wound on the rod. The web 12 is of substantially the same width as the bottom and back panels 12 and 14. The web 32 is connected to the bottom and back panels by means of a sleeve 34 of flexible material. The sleeve when laid flat is about the same width as the two panels 12 and 14 and web 32. The free edge of the web 32 extends inside the closed end of the web 32 and is stitched thereto where indicated at 36 across the full width of the web. The other end of the web 32 is open as shown in FIG. 7. The top portion of the open end of the web 32 is stitched to the lower edge of the back panel 14 by a line of stitching 38 across the full width of the panel. The bottom portion of the open end is stitched to the rear edge of the bottom panel 12 by a line of stitching 40 across the full width of the panel.

A torsion spring 42 within tubular rod 22 encircles the bar 24 and has one end secured to the rod and the other end secured to the bar to apply a constant torque to the rod tending to roll up the web 32 on the reel. The bar 24 is kept from rotating by its connection to the arms 26. The spring tension is sufficient to reel up not only the web 32 but also the two panels 12 and 14. While a spring tensioned take-up reel is preferred, obviously the reel does not need to be spring tensioned and could be operated by a hand crank, if desired.

The seat covering is shown in its position of use in FIG. 4 in which the panels have been withdrawn from the reel 16 and releasably secured to the bottom and back seat cushions. There is a rod 44 across the front edge of the bottom panel 12. As seen in FIGS. 8 and 9, the rod 44 is held within a folded back end and stitched front end portion to the bottom panel. This rod 44 is made up of rod sections 46 which are articulated or pivoted end to end so as to better follow the contour along the front edge of the bottom seat cushion. The fabric along the front edge of the bottom panel 12 is cut away where indicated at 48 to provide clearances at laterally spaced points along the width of the panel so that the rod 44 may be engaged by the hooks 50 projecting from the front surface of the bottom panel to releasably secure the bottom panel in its position of use covering the top and forwardly facing portions of the bottom seat cushion. The fabric along the front edge of the bottom panel is also cut away centrally at 49 to enable the rod 44 to be gripped.

The upper edge of the back panel 14 is formed with openings at laterally spaced points indicated by numerals 52 in positions to be engaged by hooks 54 projecting from the back seat cushion along the upper edge thereof for the purpose of releasably retaining the back panel 14 in its position of use covering the front surface of the seat back 20.

Also provided along the upper edge of the back panel 14 are laterally spaced snap fastener elements 56 adapted to snap together with complementary snap fastener elements 58 across the width of the bottom panel 12 so that the two panels may be secured together in surface-to-surface relation as shown in FIG. 2.

A guide plate 60 mounted on the platform 28 has a curved rear section 62 and is adapted to guide the panels and the web when they are either retracted onto or withdrawn from the reel.

When not in use, the web and panels 12 and 14 will be retracted and wound up on the reel in the position shown in FIG. 5 with the ends of the rod 44 engaging the stops 64 depending upon the platform 28 to prevent further retraction. The spring tension in the reel retains the parts in this position.

When it is desired to extend the panels to their positions of use covering the bottom and back seat cushions, the rod 44 is grasped by the hand at the central portion 49 to pull the panels between the rear edge portion of the bottom seat cushion 18 and the lower portion of the back seat cushion 20 and then engage the rod 44 over the hooks 50 along the front edge of the bottom seat cushion. The fasteners 56, 58 are then unsnapped and the back panel 14 swung up to the position in FIG. 4, engaging the eyes 52 with the hooks 54. The protective cover is now in its position of use overlying and protecting the vulnerable surfaces of the seat from wear and tear. The space where the rear of the bottom seat cushion and the bottom of the back seat cushion meet is kept from collecting dirt and debris by the sleeve 34 which although open at the front is closed at the rear end, making it easy to clean.

When it is desired to retract the seat cover to its stored position, the hooks and eyes 52 and 54 are disengaged, the back panel 16 is swung down upon the upper surface of the bottom panel 12 and releasably connected thereto by the snap fasteners 56, 58, after which the rod 44 is disengaged from hooks 50. The spring tension of the reel acts to reel in and take up the panels and keep them in the stored position of Fig. 5.

FIGS. 13 and 14 show a modification which is substantially exactly like the previously described unit, except that the reel 16A is mounted in a space within the bottom cushion, instead of within the back cushion. The reel 16A is of the same construction as reel 16 previously described, being mounted on the platform 28A by the arms 26A. In this construction, the guide is made integral with the platform and has the contoured rear extension 62A over which the panels and web are guided. The other details of construction of the protective covering are identical and need not be further described.

FIG. 15 shows a further modification differing only in that the reel 16B is mounted behind or at the rear of the bottom seat cushion 18. FIG. 16 shows still another modification in which the reel 16C is mounted beneath the rear end portion of the bottom seat cushion. Otherwise, the details of construction of the reels 16B and 16C are exactly like those previously described, and the other components of the protective covering are identical.

I claim:

1. Protective covering for an automotive vehicle seat having a bottom seat cushion and a back seat cushion extending upwardly from the rear edge portion of the bottom seat cushion, comprising a bottom panel for covering the bottom seat cushion, a back panel for covering the back seat cushion, a take-up reel adapted to be mounted near the rear edge portion of said seat, and means for connecting said panels to said reel comprising a web wound upon said reel to which one edge portion of each panel is connected, said panels being connected to said web by a sleeve, one end of said sleeve being connected to said web, the other end of said sleeve having opposed portions connected respectively to said one edge portion of said bottom panel and said one edge portion of said back panel, said bottom and back panels being adapted to be retracted onto said reel to an inoperative, stored position and to be withdrawn from said reel between the rear edge portion of said bottom seat cushion and said back seat cushion to positions of use respectively covering said bottom and back seat cushions.

2. Protective covering for an automotive vehicle seat as defined in claim 1, wherein said one end of said sleeve is closed and said other end thereof is open.

3. Protective covering for an automotive vehicle seat having a bottom seat cushion and a back seat cushion extending upwardly from the rear edge portion of the bottom seat cushion, comprising a bottom panel for covering the bottom seat cushion, a back panel for covering the back seat cushion, a take-up reel adapted to be mounted near the rear edge portion of said seat, a web wound upon said reel, means for securing one edge portion of each panel to said web comprising a sleeve having a closed end stitched to said web across the full width of the latter and having an open end provided with opposed portions stitched respectively to said one edge portion of said bottom panel and said one edge portion of said back panel across the full width of said panels, said bottom and back panels being adapted to be retracted onto said reel to an inoperative, stored position and to be withdrawn from said reel between the rear edge portion of said bottom seat cushion and said back seat cushion to positions of use respectively covering said bottom and back seat cushions, guide means over which said panels move when withdrawn from said reel, and means for releasably securing said panels to said cushions when in positions of use.

4. Protective covering for an automotive vehicle seat as defined in claim 3, wherein said means for releasably securing said panels to said cushions includes interengaging hook and eye means along the edge of said back panel remote from said reel and also along the top portion of said back seat cushion, and a rod along the edge of said bottom panel remote from said reel made of articulated rod sections and adapted to be releasably held to said bottom seat cushion by a plurality of hooks, said rod providing a means which may be gripped by hand to withdraw said panels from said reel as aforesaid.

5. Protective covering for an automotive vehicle seat as defined in claim 4, having means for releasably securing said panels together in surface-to-surface relation.

6. Protective covering for an automotive vehicle seat as defined in claim 5, wherein said take-up reel is mounted in said back seat cushion.

7. Protective covering for an automotive vehicle seat as defined in claim 5, wherein where said take-up reel is mounted in said bottom seat cushion.

8. Protective covering for an automotive vehicle seat as defined in claim 5, wherein said take-up reel is mounted behind said bottom seat cushion.

9. Protective covering for an automotive vehicle seat as defined in claim 5, wherein said take-up reel is mounted beneath said bottom seat cushion.

* * * * *